(12) United States Patent
Dessouroux

(10) Patent No.: US 6,206,625 B1
(45) Date of Patent: Mar. 27, 2001

(54) NUT WITH POSITIVE AND MICROMETRIC AUTOMATIC LOCKING

(75) Inventor: Alexis Dessouroux, Malmedy (BE)

(73) Assignee: European Locking Devices S.A., Malmedy (BE)

( * ) Notice: Subject to any disclaimer, the term of this patent is extended or adjusted under 35 U.S.C. 154(b) by 0 days.

(21) Appl. No.: 09/257,609

(22) Filed: Feb. 25, 1999

Related U.S. Application Data

(60) Provisional application No. 60/076,079, filed on Feb. 26, 1998.

(51) Int. Cl.$^7$ .................................................. F16B 39/30
(52) U.S. Cl. ............................ 411/208; 411/211; 411/946
(58) Field of Search ........................... 411/205–211, 194, 411/195, 119, 120, 946, 952

(56) References Cited

U.S. PATENT DOCUMENTS

| | | | |
|---|---|---|---|
| 500,095 | * | 6/1893 | Bradford ............................ 411/946 |
| 622,764 | * | 4/1899 | Ford ................................... 411/946 |
| 703,016 | * | 6/1902 | Tash ................................... 411/211 |
| 830,787 | * | 9/1906 | Hill ..................................... 411/946 |
| 1,067,163 | * | 7/1913 | Broomfield ....................... 411/208 |
| 1,067,367 | * | 7/1913 | Noster ................................ 411/946 |
| 1,414,761 | | 5/1922 | Thamann . |
| 1,573,328 | * | 2/1926 | Sale .................................... 411/205 |
| 4,328,720 | | 5/1982 | Shiel . |
| 5,597,278 | * | 1/1997 | Peterkort .......................... 411/120 |
| 5,618,143 | * | 4/1997 | Cronin .............................. 411/120 |
| 5,674,034 | * | 10/1997 | Bennett ............................. 411/120 |

FOREIGN PATENT DOCUMENTS

| | | |
|---|---|---|
| 0 102 898 | 3/1984 | (EP) . |
| 0 608 246 B1 | 11/1995 | (EP) . |
| 2 321 625 | 3/1977 | (FR) . |
| 2 358 580 | 2/1978 | (FR) . |
| 547624 | 9/1942 | (GB) . |
| WO 93/05307 | 3/1993 | (WO) . |

* cited by examiner

*Primary Examiner*—Flemming Saether
(74) *Attorney, Agent, or Firm*—Alix, Yale & Ristas, LLP

(57) ABSTRACT

Nut with positive and micrometric locking intended to be screwed on a shaft (1)(23)(60)(70) comprising a serrated part (2)(24)(59)(72) and locking segments (15)(37)(44)(75) having each one at least one tooth (19)(41)(58)(76), and which are intended to fix in rotation the nut (4)(26)(54)(73) on the shaft (1)(23)(60)(70), said locking segments (15)(37)(44)(75) being movable between a first locked position and a second unlocked position, the locking segments (15)(37)(44)(75) being constantly and independently radially stressed by a torical spring (21)(43)(45)(78).

15 Claims, 12 Drawing Sheets

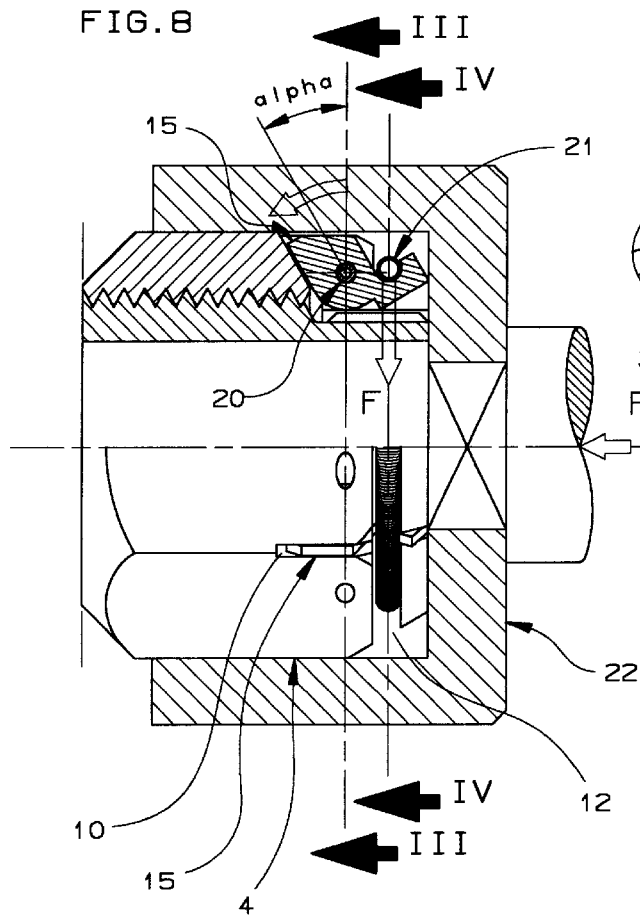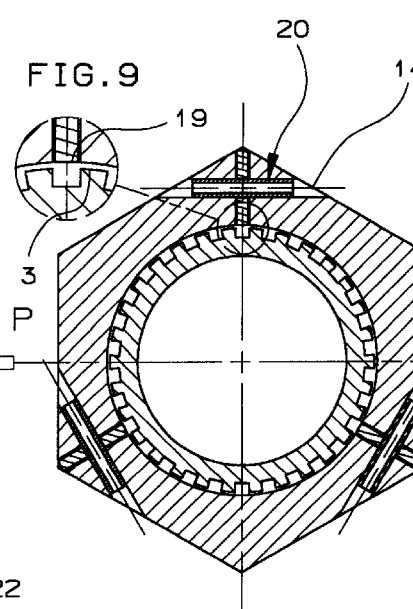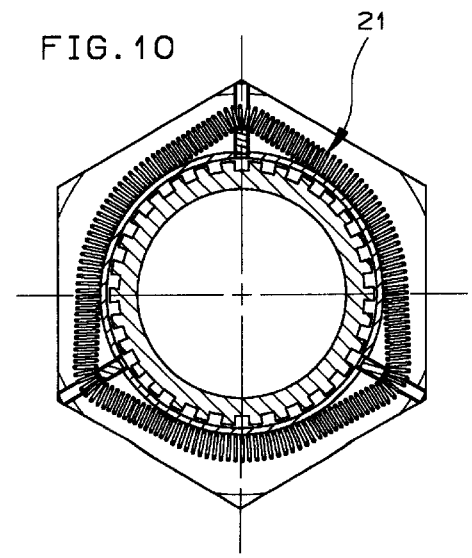

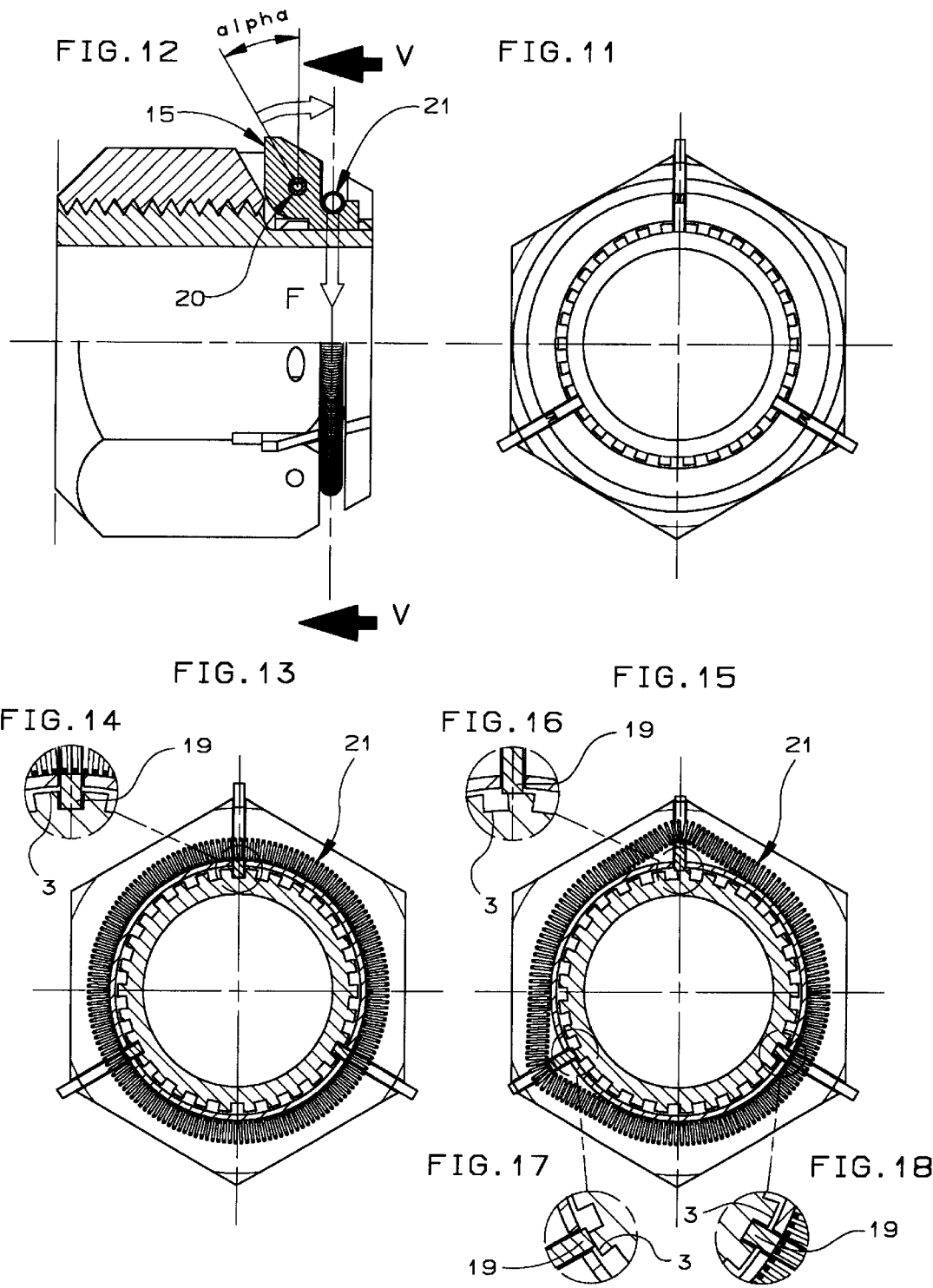

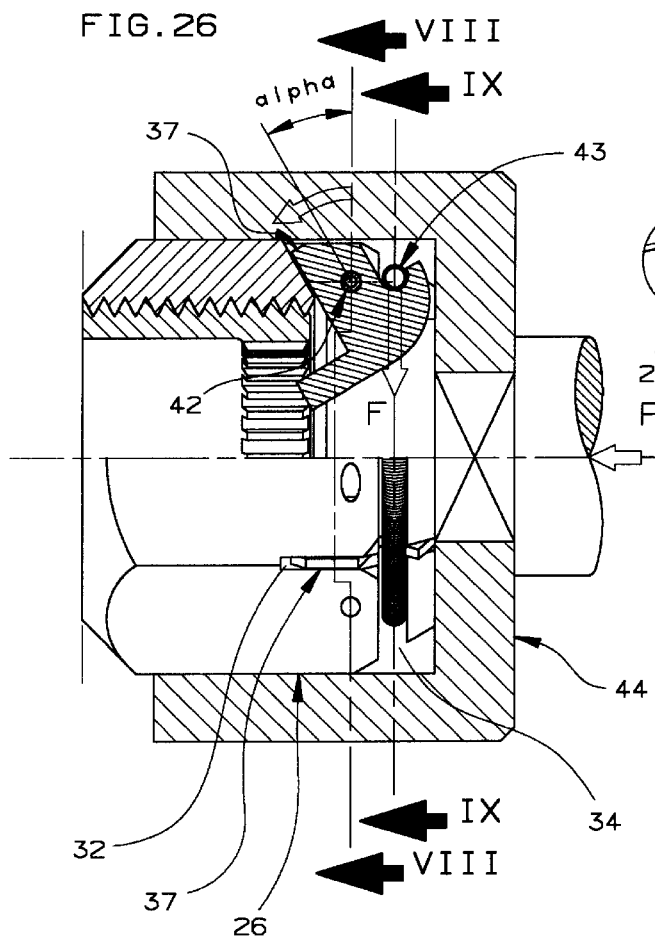
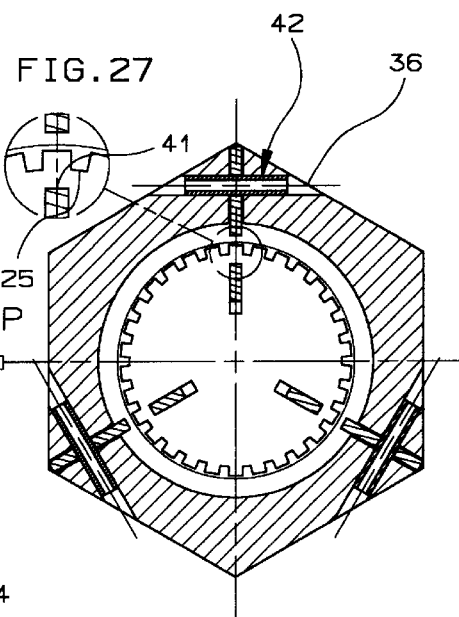
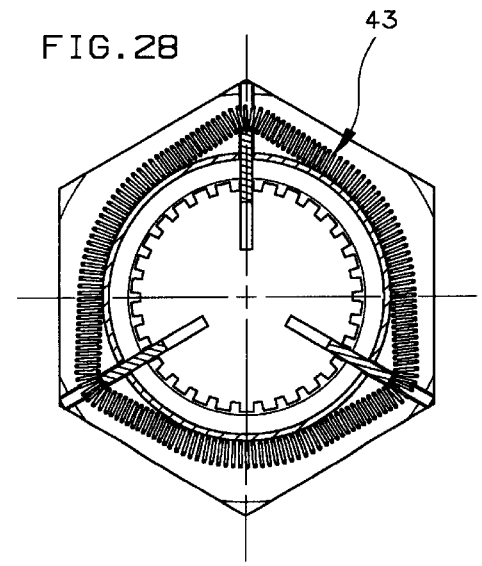

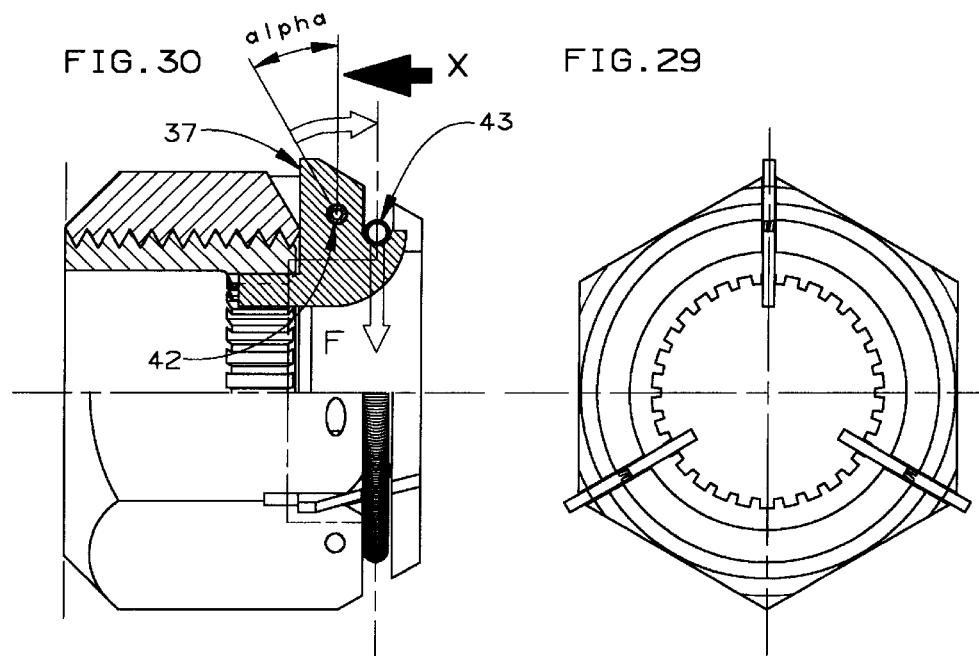
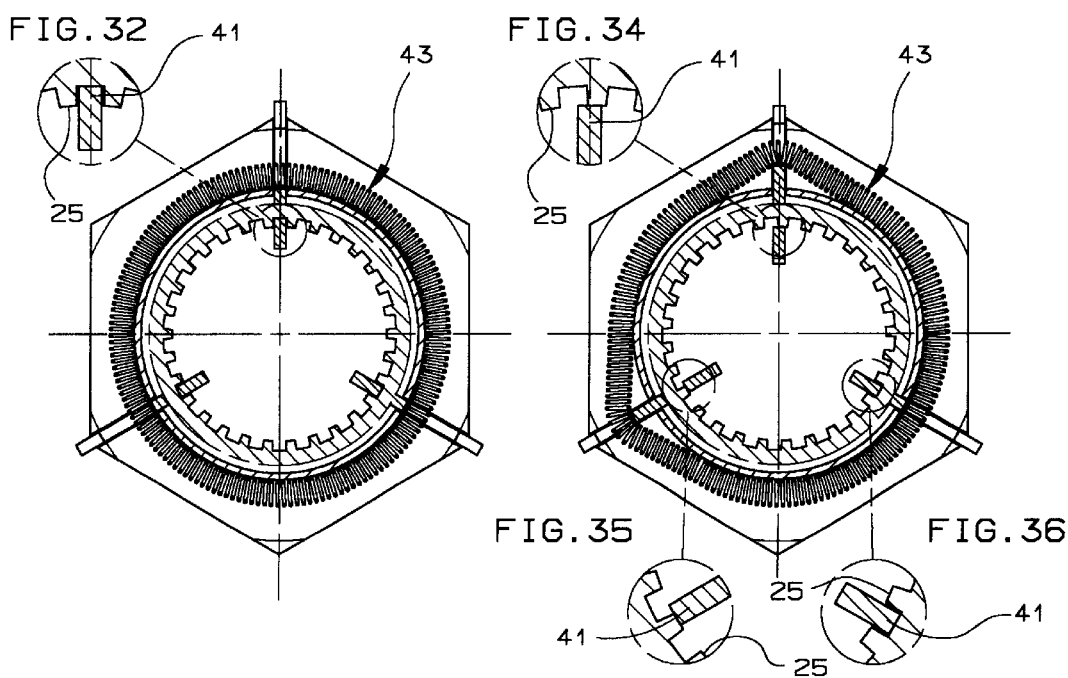

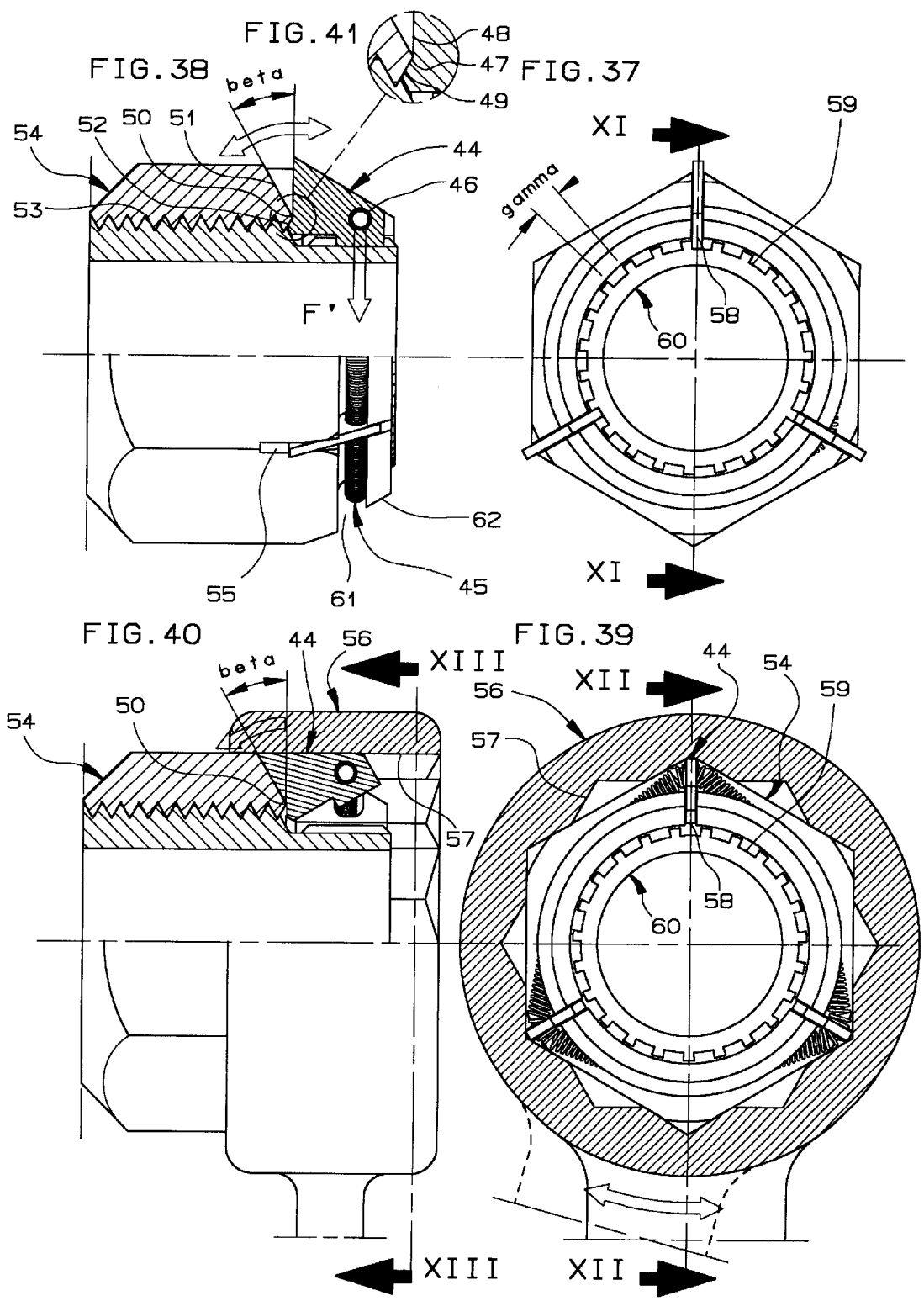

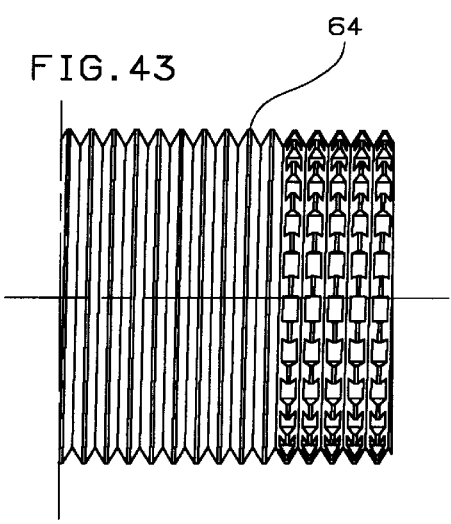
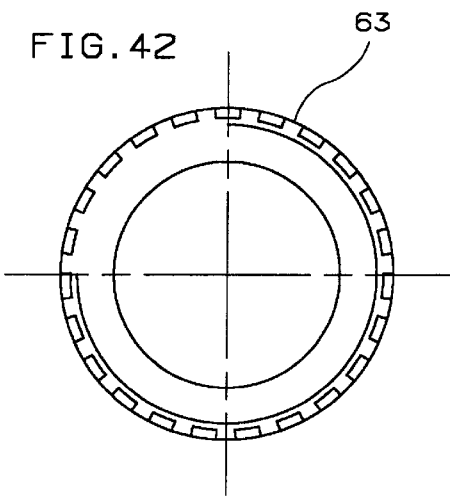
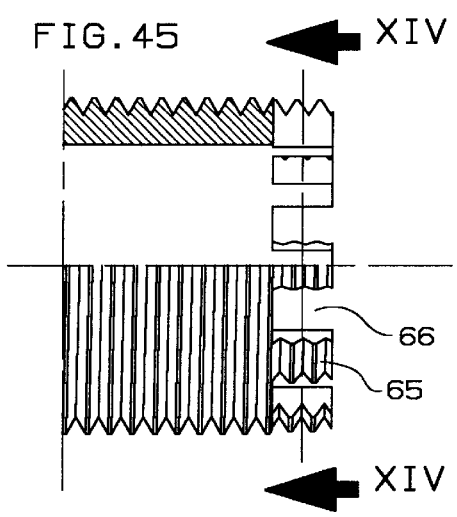
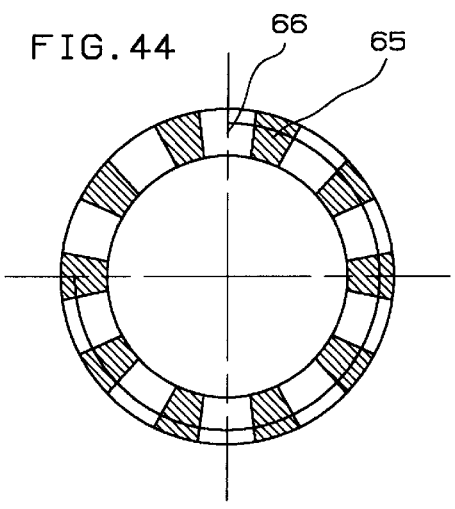
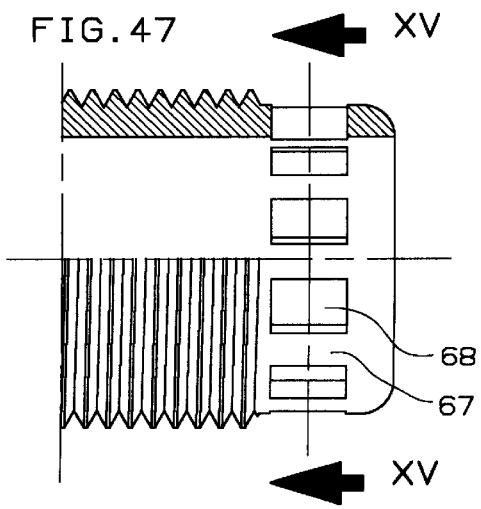
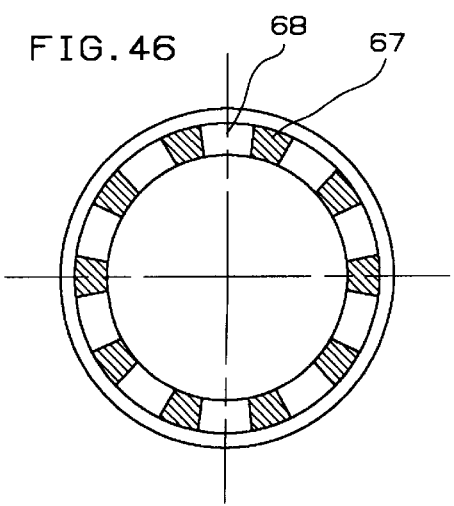

FIG. 48A
FIG. 48B
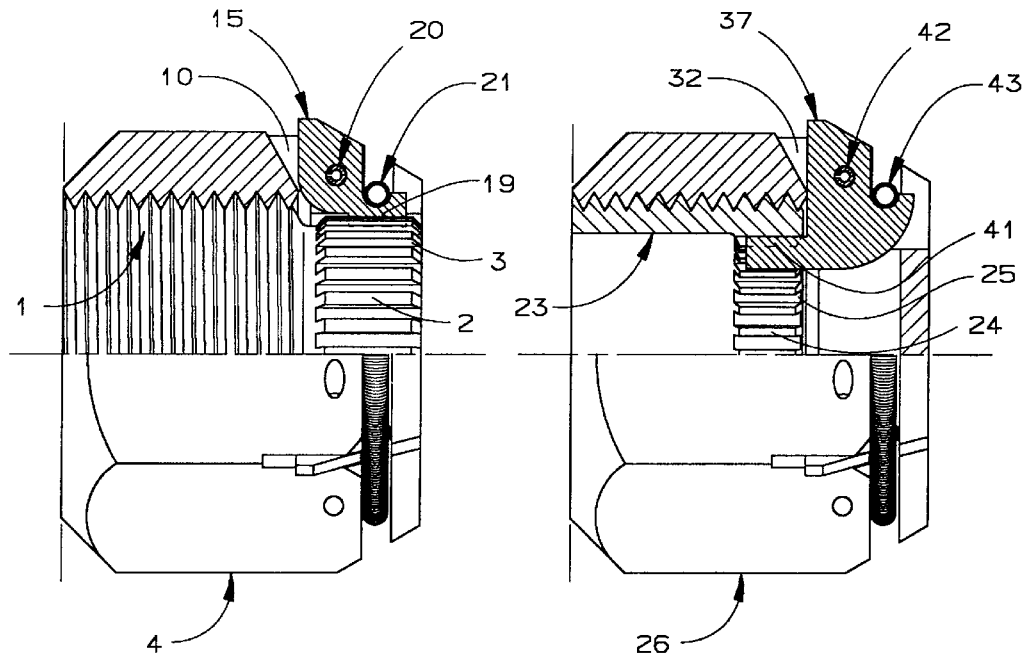
FIG. 48C
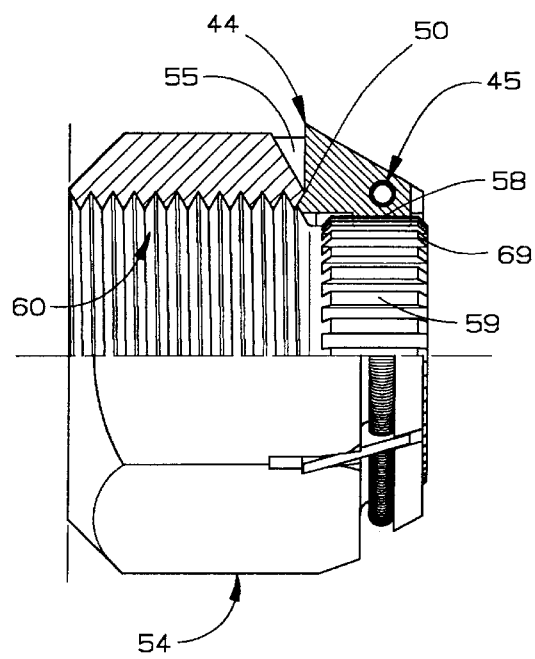

NUT WITH POSITIVE AND MICROMETRIC AUTOMATIC LOCKING

CROSS REFERENCE TO RELATED APPLICATIONS

This application is based on U.S. provisional patent application Serial No. 60/076,079, which was filed on Feb. 26, 1998, titled NUT WITH POSITIVE AND MICROMETRIC AUTOMATIC LOCKING, and which provisional application is incorporated by reference herein.

BACKGROUND OF THE INVENTION

1. Field of the Invention

The present invention relates to fastener assemblies, and more particularly to an improved nut which automatically locks to a shaft.

2. Description of the Related Art

It has been described by the applicant in the publication WO 93/05307 of Sep. 2, 1992, a nut with positive and automatic locking intended to be screwed on a shaft having a serrated thread, said nut comprising a locking element having serrations on its internal diameter, intended to fix the nut in rotation on the shaft, this locking element being confined in a counterbore of the nut and axially movable in said counterbore between a first locked position and a second unlocked position, characterized in that the locking element is composed of several segments of serrated ring, the different segments being jointed by a resilient circular ring.

This publication describes, in a first embodiment, that the disengagement of the serrations of the locking element from the serrations of the shaft is obtained by a radial motion and that in a second embodiment it can also be obtained by a rotational motion of the segments of the locking element round geometrical axis going through perpendicularly and in its center, the perpendicular section of the resilient ring that allows to embody the different segments.

The object of the present invention relates principally to an improvement of the second embodiment of said publication.

Many types of nuts with positive locking are already known, the most common one is the castellated nut associated with a pin installed in a hole of the shaft on which the nut is screwed and which extends at one and the same time in this hole and in two crenels of the nut.

This particular type of nut has some disadvantages inherent to its structure, particularly an insufficient strength, a poor reaction to the vibrations and a limited effectiveness.

It has been improved by introducing a locking device in the nut with positive locking. This type of nut is particularly described in the documents FR-A-2 358 580 and U.S. Pat. No. 4 328 720.

Document EP-0 102 898 describes a particular example of a nut device with positive automatic locking intended to be fixed in rotation on the shaft and having a locking element.

In this document, the locking element has the shape of threaded ring confined in a counterbore of the nut with which it is associated in rotation. The ring has serrations along its internal thread intended to cooperate with the complementary serrations of the threaded portion of the shaft when both thread threads of the ring and the nut are in phase.

Nevertheless, the effectiveness of such a nut may be compromised under the effects of vibrations.

Document FR-A-2 321 625 describes a lock nut comprising mainly a ring with internal serrations and an opened toric ring lodged in a circular groove located on the external part of this ring. One should note on the one hand that this ring is made in one piece, and on the other hand that this ring is, in this case, acting as a retainer circular clip in said nut to lock.

Document GB-A-547 624 mentions the possibility of a locking obtained by pressure of the threads of the nut on those of the shaft, pressure obtained by a resilient toric opened ring pressing radially a rear and solidary skirt of the nut partially made malleable by radial millings. It will also be noted that the artificial segmentation obtained by millings in the nut is integrally making part of the nut. From another side, the obtained locking is a limited locking and only based on the friction capacities of the thread of the nut in relation to the thread of the screw.

Document U.S. Pat. No. 830,787 describes a nut having on its rear part a protrusion, of squared shape, intended to be able to manipulate it with a special closed key provided itself, with an internal cutting of a squared shape of same size that those of the nut. Another particularity of this nut is, that it comprises in the middle of only one flat of its squared shape, a movable pawl on a rotation axle incorporated in the nut. This pawl is stressed by the pressure of a cylindrical compression spring intended to be lodged in the single groove machined on the thread of the screw. The particular wrench is provided in its entry with a special machining intended, during the engagement of this one on such a nut, to provoke the rocking of the pawl on its rotation axle and to allow so to disengage it from the groove in order to be able to move the nut on the screw.

The inconvenient of such a nut are easily noted which, on the one hand, requires a very specific particular tool and on the other hand provides the possibility to lock the nut only every 360° . . . which means at each turn of the nut.

Document U.S. Pat. No. 1,414,761 describes, as regard to it, a nut similar to the previous one which is also provided with only one anti-rotation pawl but which is different from the previous one:

by its external hexagonal shape;

by the necessity to use an adjusting wrench which rocks, during its installation, the anti-rotation pawl;

by the possibility to machine on the screw a wider quantity of grooves in order to increase the number of locked position on the 360° of one turn of a nut.

It may be easily noted that such a nut which is still provided with only one locking pawl and which could not be provided with more, regarding the conception of the recommended installation tool, it is to say an adjusting wrench, the total number of locking positions on one turn of a nut will always and exclusively be restricted to the number of grooves on the screw; moreover, the necessity to be obliged to use always an adjusting wrench restricts the applications of such a nut to the only locations where there is a large radial access to the nut, which is unfortunately not the case of most usual mechanical applications.

Finally, document EP-0 608 246 B1 describes an automatic positive locking nut intended to be screwed onto a shaft having a serrated thread, said nut comprising a locking element having serrations on its internal diameter intended to fix the nut in rotation on the shaft, this locking element being confined in a counterbore of the nut and being axially movable in said counterbore between a first locking position and a second unlocking position characterized in that the locking element is constituted by several segments of serrated ring, the different segment being rendered jointly responsible by a circular resilient ring. Said locking position corresponding to the position for which the serrations of each segment of the locking element cooperate perfectly with the complementary serrations along the thread of the shaft, and said unlocking position corresponding to the position in which the serrations of each segment of the locking element are totally disengaged from the serrations along the thread of the shaft. Said patent mentions, in a first embodiment, that the disengagement of the serrations of the locking element from the serrations along the thread of the shaft is obtained by a radial motion of the segments of the locking element and that in a second embodiment it can also be obtained by a rotational motion of the segments of the locking element round geometrical axis going through perpendicularly and in its center, the perpendicular section of the resilient ring that allows to embody the different segments. Although this second embodiment would work perfectly, it can be noted that in practice the rotational motion of the segments in the space is wide-spreading. Moreover, this rotational motion having to be done in a counterbore machined in the rear part of said nut, the external sizes of the nut have to be adjusted in accordance and so that the result will be an oversized nut comparatively to a commercial standard nut of same thread size, with a more important additional weight prejudice.

SUMMARY OF THE INVENTION

This invention aims at providing not only an improved nut which can be locked surely and efficiently on a shaft, without the drawbacks of the nuts of the prior art, the locking being of positive and micrometric automatic type but also to improve the achievements of the second embodiment of the invention described in document WO 93/05307.

Particularly, the present invention aims at providing an improved nut intended for applications where high levels of vibrations are encountered and especially where very high rotation speeds are also encountered. The nut according to the present invention will be inclined to amortize the vibrations to which it is submitted and to lock itself allthemore since the speed increases, achieved by the possibility to develop locking segments, by an adequate weight repartition, unbalanced in relation to their rotation axles, in order to generate, in rotative applications, by the phenomena of centrifugal force, a radial force acting on each segment in the way of locking which will be allthemore important since the speed will increase.

The invention comprises essentially the characteristics appearing in the claims.

It is considered according to the present invention that, as the rotational motion of the segments in the space is wide-spreading as described in publication WO 93/05307, this phenomena can be easily opposed on condition that: on the one hand the number of teeth on each segment is reduced to its simplest expression, particularly to one single tooth, while reducing simultaneously the angle of the arc of the segment proportionally and, on the other hand to realize the rotation of each segment not round virtual axles anymore but well round real axles such as pivots jointed to the nut and going trough free, by a machined hole, their own segment or even round a firm solid angle of intersection of two surfaces, such as the beam of a balance on its fulcrum.

The segments having each the possibility, and independently, to rock round these real axles are moreover, provided with an aperture in which is lodged a circular resilient ring or closed torical spring, which allows to act radially and permanently upon the different segments by pressing firmly their tooth in one of the facing grooves of the serrations of the shaft. This circular resilient ring or closed torical spring is prestressed in a circular groove located in a truncated conical area of the rear and external part of the nut and fits exactly, through each radial slot machined in the nut, the aperture machined on each locking segment.

Moreover, the tangs of the locking segments, reduced in the case of the present invention to the thickness of one tooth, are slightly sticking out of the hexagonal or other external shape of the nut and preferably, in the present case, at the tops of the hexagon.

It is necessary to note that, the external shape of the nut is not restricted to the hexagonal shape and may be of any other shape, according to a perfect fit of its external shape with the internal shape, obligatory closed, of the installation tool.

As a result, the engagement of such a tool on the nut, will inevitably lead during its motion to a hooking with each of the tangs of the segment sticking out the tops of the hexagonal or other shape of the nut which will result in the rocking motion of each segment round their own axle. This will have as a result, on the one hand the disappearing of all the tangs in the interior of the hexagonal or other external shape of the nut allowing the tool to move more or less freely on the nut thanks to the reaction of the torical spring and, on the other hand the radial ascent of the tooth allowing the nut to be freely engaged on the thread of the serrated shaft.

The opposite phenomenon consisting to remove the tool from the nut, the latter once installed on the shaft, will release each of the segments from the stress which was applied by the tool and will allow them to rock round their own axle under the radial stress of the closed torical spring forcing each of the segments to engage its tooth in the facing groove on the serrations of the shaft.

Although the flanks of the single tooth on each of the segments may be of an inclined shape, it will be preferred in order to obtain a free and positive locking, perpendicular flanks which will then perfectly fit with the grooves of same shape of the serrations of the shaft.

A second preferred embodiment of the present invention consisting in considering the serrations of the shaft inside a boring located into the shaft will be also described.

It will be also described a third preferred embodiment of the present invention consisting in, on the one hand to suppress the need of pivots of rotation going through each locking segment by replacing them by firm solid angles of intersection of two surfaces, round which will rotate the locking segments and, on the other hand to have a nut which, whatever its angular position on the screw may be, will procure to the user the confidence to be always locked.

According to a further embodiment of the invention, the locking principle of the first embodiment of the present invention can be inverted by adapting to the shaft the same locking means as those initially intended for the nut and vice versa by adapting to the nut the same locking means as those initially intended for the shaft.

BRIEF DESCRIPTION OF THE DRAWINGS

The present invention will be better understood with the following description given as illustration and referring to the appended set of drawings, on which:

FIG. 7 is a cross-sectional view of the shaft and the nut being in the unlocked position according to the first embodiment of the present invention, being taken along the line III—III of FIG. 8;

FIG. 8 is a side view, partly in cross-section, of an assembly comprising the shaft, the nut in the unlocked position and the socket wrench, according to the first embodiment of the present invention.

FIG. 9 is an enlarged view of a portion of FIG. 7 depicting a tooth of a segment with the shape of the male serrations of the shaft in the unlocked position;

FIG. 10 is a partly cross-sectional view of the shaft and the nut being in the unlocked position and being taken along the line IV—IV of FIG. 8;

FIG. 11 is an end view of the shaft and the nut being in the locked position according to the first embodiment of the present invention;

FIG. 12 is a side view, partly in cross-section, of an assembly comprising the shaft, the nut in the locked position according to the first embodiment of the present invention;

FIG. 13 is a partly cross-sectional view of the shaft and the nut being in the locked position according to the first embodiment of the present invention and being taken along the line V—V of FIG. 12;

FIG. 14 is an enlarged view of a portion of FIG. 13 depicting a tooth of a segment with the shape of the male serrations of the shaft in the locked position;

FIG. 15 is a partly cross-sectional view of the shaft and the nut being in the locked position in a case where the number of grooves in the male serrations of the shaft is not an integer multiple of the number of segments, according to the first embodiment of the present invention and being taken along the line V—V of FIG. 12;

FIGS. 16, 17 and 18 are enlarged views of portions of FIG. 15 depicting a tooth of a segment with the shape of the male serrations of the shaft;

FIG. 25 is a cross-sectional view of the shaft and the nut being in the unlocked position according to the second embodiment of the present invention, being taken along the line VIII—VIII of FIG. 26;

FIG. 26 is a side view, partly in cross-section, of an assembly comprising the shaft, the nut in the unlocked position and the socket wrench, according to the second embodiment of the present invention.

FIG. 27 is an enlarged view of a portion of FIG. 25 depicting a tooth of a segment with the shape of the female serrations of the shaft in the unlocked position;

FIG. 28 is a partly cross-sectional view of the shaft and the nut being in the unlocked position and being taken along the line IX—IX of FIG. 26;

FIG. 29 is an end view of the shaft and the nut being in the locked position according to the second embodiment of the present invention;

FIG. 30 is a side view, partly in cross-section, of an assembly comprising the shaft, the nut in the locked position according to the second embodiment of the present invention;

FIG. 31 is a partly cross-sectional view of the shaft and the nut being in the locked position according to the second embodiment of the present invention and being taken along the line X—X of FIG. 30;

FIG. 32 is an enlarged view of a portion of FIG. 31 depicting a tooth of a segment with the shape of the female serrations of the shaft in the locked position;

FIG. 33 is a partly cross-sectional view of the shaft and the nut being in the locked position in a case where the number of grooves in the female serrations of the shaft is not an integer multiple of the number of segments, according to the second embodiment of the present invention and being taken along the line X—X of FIG. 30;

FIGS. 34, 35 and 36 are enlarged views of portions of FIG. 33 depicting a tooth of a segment with the shape of the female serrations of the shaft;

FIG. 37 is an end view of the shaft and the nut in the unlocked position according to a third embodiment of the present invention;

FIG. 38 is a partly cross-sectional view of the shaft and the nut being in the locked position, according to the third embodiment of the present invention and being taken along the line XI—XI of FIG. 37;

FIG. 39 is a partly cross-sectional view of the shaft, the nut unlocked by the closed key, according to the third embodiment of the present invention and being taken along the line XIII—XIII of FIG. 40;

FIG. 40 is a side view, partly in cross-section, of the shaft, the nut unlocked by the closed key, according to the third embodiment of the present invention and being taken along the line XII—XII of FIG. 39;

FIG. 41 is a side enlarged view of the rotation axle of a segment, realized by the intersection of the internal chamfer of the nut with the flat bottom of a radial slot milled in the nut;

FIG. 42 is an end view of a possibility of a shaft which has the serrations directly on the thread;

FIG. 43 is a side view of FIG. 42;

FIG. 44 is an end view, partly in cross-section, of a possibility of a shaft which has the serrations at its end, being taken along the line XIV—XIV of FIG. 45;

FIG. 45 is a side view of FIG. 44, partly in cross-section;

FIG. 46 is an end view, partly in cross-section, of a perforated shaft, being taken along the line XV—XV of FIG. 47;

FIG. 47 is a side view of FIG. 46, partly in cross-section;

FIGS. 48a, 48b, 48c and 48d are respectively side views, partly in cross-section, of the nut on the shaft in the locked position, according to the three embodiments of the present invention (48a, 48b and 48c) and to the further embodiment wherein the shaft comprises the locking intended for the nut in the three first embodiments above mentionned and vice versa (48d);

DETAILED DESCRIPTION OF THE PREFERRED EMBODIMENTS

Figure 2:
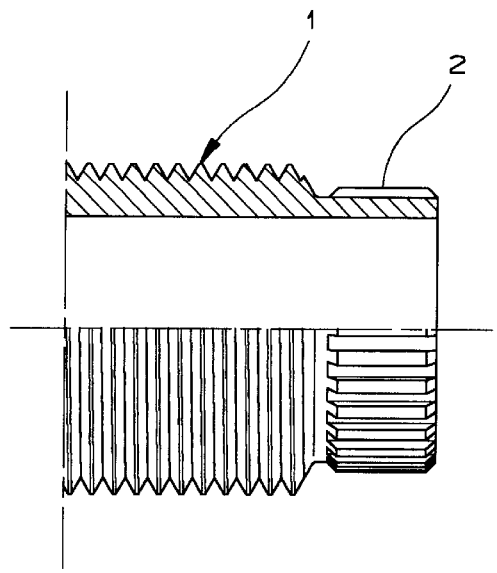
FIG. 2 is a side view, partly in cross-section, of the shaft according to the first embodiment of the present invention, the cross-section being taken along the line I—I of FIG. 1.

FIG. 2 represents a threaded shaft 1 according to a first preferred embodiment of the present invention on which, a nut with positive and micrometric automatic locking according to the present invention, will be screwed. It is advisable to note that the entry of the shaft 1 has on a protrusion 2 a male serrated shape 3 with grooves having perpendicular flanks particularly well represented on FIG. 1.

Figure 4:
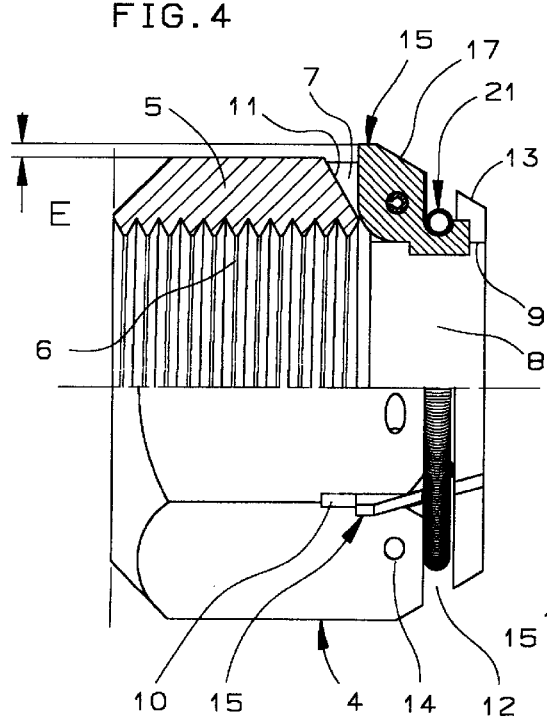
FIG. 4 is a side view, partly in cross-section, of the nut according to the first embodiment of the present invention, the cross-section being taken along the line II—II of FIG. 3.

FIG. 4 represents the nut with positive and micrometric automatic locking according to a first embodiment of the present invention. The half upper part of the figure is a section view, the half inferior part of the figure is a side view.

The nut with positive and micrometric automatic locking according to the present invention is indicated generally at 4. It is composed of a nut properly so called, of hexagonal or other shape, which includes a massive body 5 that has a central bore with an internal thread 6 and from which extends to the back a skirt 7 which delimits a counterbore 8. The counterbore 8 is a cavity with a cylindrical internal wall 9.

Figure 3:
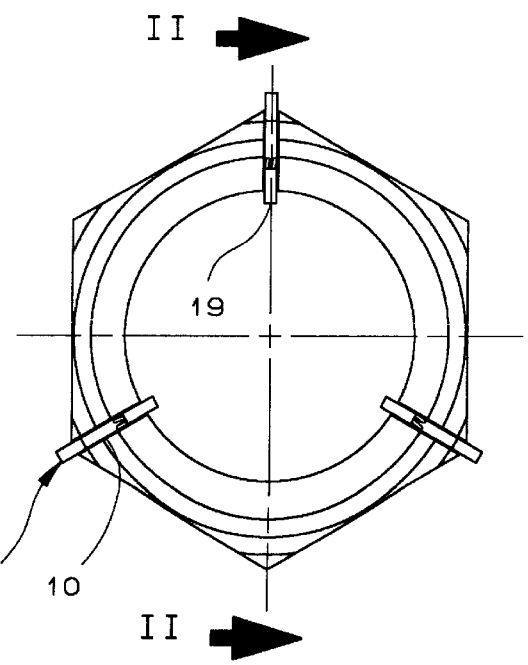
FIG. 3 is an end view of the nut according to the first embodiment of the present invention.

The skirt 7 has a certain number of radial slots 10, at least one, which are equally spaced as represented at the FIG. 3. FIG. 4 shows perfectly that these slots are milled in full the thickness of the skirt 7 and are terminated, at the junction with the body 5 of the nut, by a slackening 11.

The skirt 7 has in addition an external circular groove 12 machined in a external truncated conical part 13 and is going clean through by holes 14 perpendicular to each one of the slots 10.

Advantageously, it has been set up into each one of the slots 10, a locking segment 15 as it appears clearly on FIG. 4.

Figure 5:
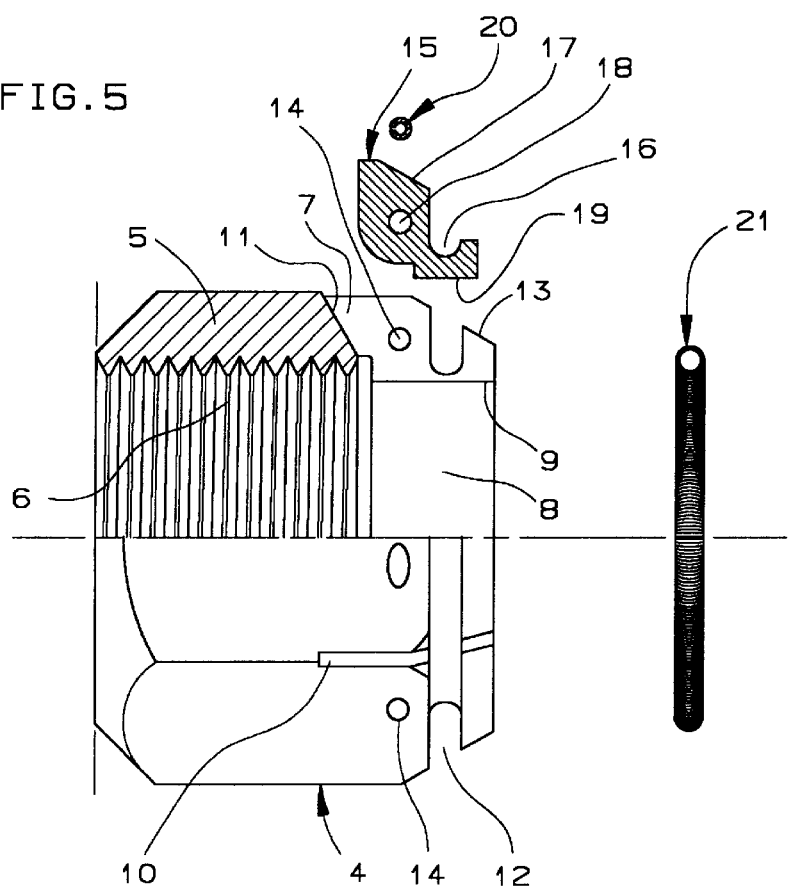
FIG. 5 is an exploded, side elevation view, partly in cross-section, of the nut of FIG. 4, according to the first embodiment of the present invention.

As may be noted from FIG. 5, the locking segments 15, besides all be identical, are provided with an aperture 16 externally oriented, a hole 18 and a ramp 17 of same inclination than the truncated conical part 13 of the nut 4. Moreover, as represented on FIG. 3, and in this case their internal part is a tooth 19 of squared shape.

The locking segments 15 will be, as represented on FIG. 5, introduced in each of the slots 10, in such a way to have the holes 14 and 18 in a perfect alignment allowing so to be crossed by pivots 20 as better represented on FIG. 7.

The sizes of the diameters of the holes 14, the holes 18 and the pivots 20 are determined in a such a way that the pivots 20 are firmly prisoner in the holes 14 and the segments 15 movable in rotation on these same pivots 20; the resilient pins, such as represented, meet perfectly these requirements and will be so preferably used.

Figure 6:
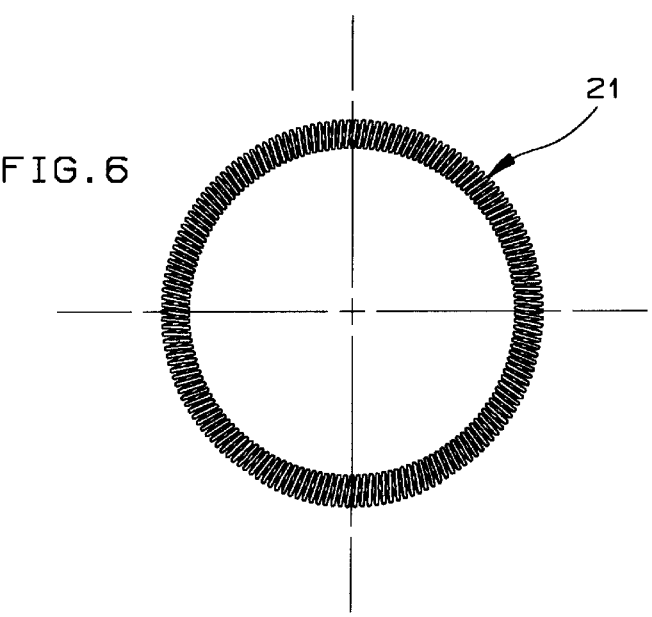
FIG. 6 is a front view of the closed torical spring of FIG. 5.

On the assembly so formed a resilient ring may then be introduced, which in this case as represented on FIG. 6 is a closed torical spring 21. This torical spring 21 is located in the external circular groove 12 and fits exactly, through each radial slot 10 the apertures 16 of each of the locking segments 15.

Consequently, as represented on FIG. 8, the locking segments 15 may then, under an axial pressure exerted on each of their tops, and independently of one another, rock of an angle "alpha", independently of one another, round each of their own pivot 20 providing the opposition of a certain radial stress "F" exerted on each of them by the closed torical spring 21 which, continually, tends to bring them back to their initial position as represented on FIG. 4.

It is advisable to note also, as represented on FIG. 4, that each of the locking segments 15 is slightly sticking out the external shape of the nut of a same value "E" and, that each of their ramp 17 is in a perfect alignment with the ramp of same inclination of the truncated conical part 13 of the nut 4.

Consequently it results on FIG. 8, that the simple action to engage a tool 22, of hexagonal or other internal shape, on the nut so constituted leads to an obligatory hooking with the locking segments 15 sticking out, of a value "E", the hexagonal or other external shape of the nut 4 inducing them to rock of an angle "alpha" round each of their own pivot 20 with as a consequence the full disengagement of the tooth 19 from the male shape 3 evident on FIG. 9; it is then spoken of an unlocked system which may move freely in rotation on the shaft. It can be noted on FIG. 10, that in this case, the spring 21 takes a convex polygonal shape.

As opposed, and as represented on FIG. 12, the simple action to release the socket 22 (not represented) from the system, leads thanks to the combined action of the closed torical spring 21 to the rocking in the inverse direction of the locking segments 15 round their own pivot 20, with as a result, the perfect engagement of the tooth 19 in one of the corresponding grooves of the male serrations 3, evident on FIG. 14; it is then spoken of system with positive automatic locking that may not move anymore freely in rotation on the shaft. It can be noted on FIG. 13, that in this case, the spring 21 comes back to its initial circular shape.

It is advisable to note that, when the number of grooves of the serrations 3 of the shaft 1 is an integer multiple of the number of locking segments 15, all the locking segments 15 of the nut 4 are in a locked position and the type of locking is called "simple".

If at the contrary, it is not the case, which means that the number of grooves of the serrations 3 of the shaft 1 is not an integer multiple of the number of locking segments 15, at least one locking segment is in a locked position and the type of locking is called "differential", which will have as a result, to increase considerably the angular precision of locking. It can then be noted on FIG. 15, that in such circumstance, the spring 21 takes a convex polygonal shape but of which one of the tops of the polygon is truncated, the reason is that the teeth represented on FIGS. 16 and 17, at the contrary to the tooth represented on FIG. 18, is not in front of a corresponding groove of the male serrations 3; it is then spoken of positive and micrometric automatic system that may not move anymore freely in rotation on the shaft.

Figure 19:
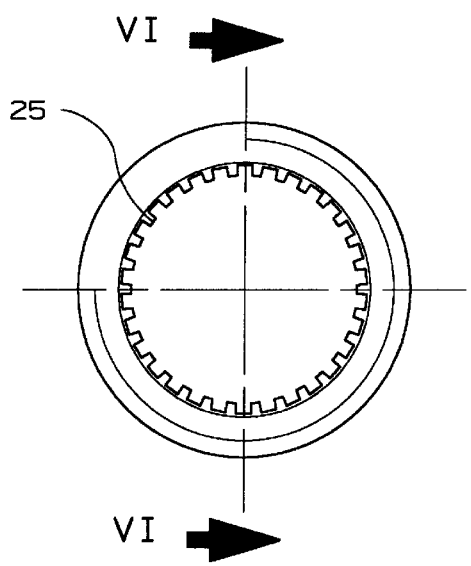
FIG. 19 is an end view of the shaft of FIG. 20 according to a second embodiment of the present invention.
Figure 20:
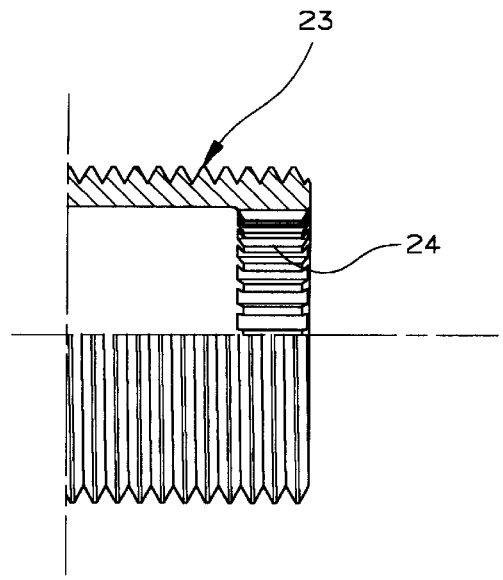
FIG. 20 is a side view, partly in cross-section, of the shaft according to the second embodiment of the present invention, the cross-section being taken along the line VI—VI of FIG. 19.

According to a second embodiment, the FIG. 20 represents a threaded shaft 23 according to a second preferred embodiment of the present invention on which, a nut with positive and micrometric automatic locking according to a second preferred embodiment of the present invention will be screwed. It is advisable to note that along its internal part, the shaft 23 has a serrated area 24 having a shape with female serrations 25 with grooves having perpendicular flanks particularly well represented on FIG. 19.

Figure 22:
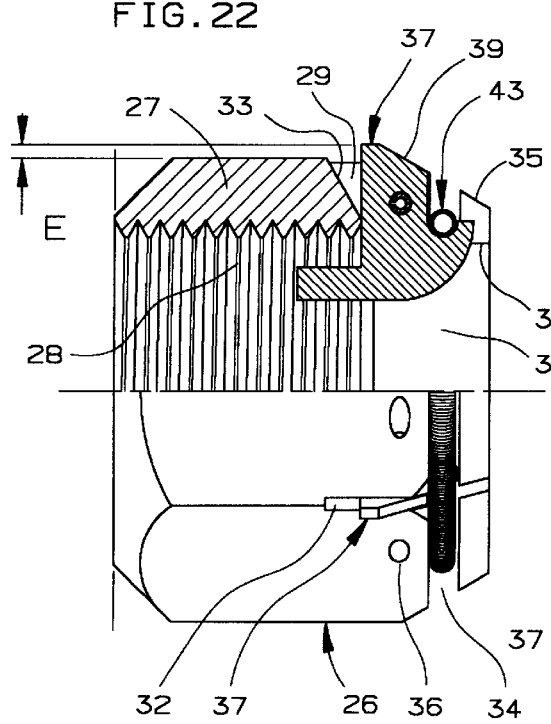
FIG. 22 is a side view, partly in cross-section, of the nut according to the second embodiment of the present invention, being taken along the line VII—VII of FIG. 21.

FIG. 22 represents the nut with positive and micrometric automatic locking according to a second preferred embodiment of the present invention. The half upper part of the figure is a section view, the half inferior part of the figure is a side view.

The nut with positive and micrometric automatic locking according to the present invention is indicated generally at 26. It is composed of a nut properly so called, of hexagonal or other shape, which includes a massif body 27 that has a central bore with an internal thread 28 and from which extends to the back a skirt 29 which delimits a counterbore 30. The counterbore 30 is a cavity with a cylindrical internal wall 31.

Figure 21:
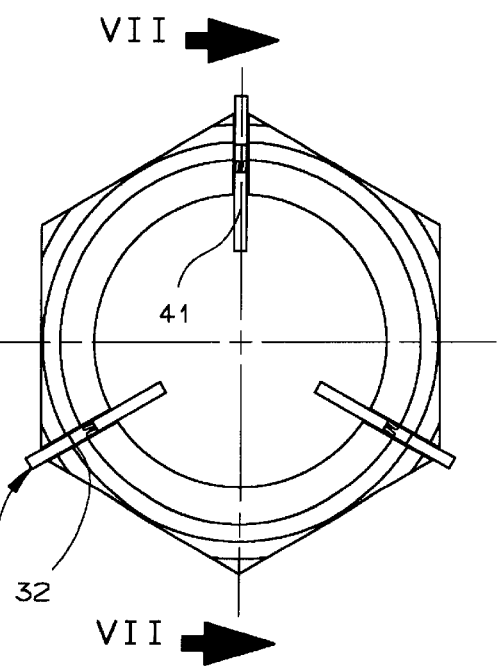
FIG. 21 is an end view of the nut according to the second embodiment of the present invention.

The skirt 29 has a certain number of radial slots 32, at least one, which are equally spaced as represented at the FIG. 21. FIG. 22 shows perfectly that these slots are milled in full the thickness of the skirt 29 and are terminated, at the junction with the body 27 of the nut, by a slackening 33.

The skirt 29 has in addition an external circular groove 34 machined in a external truncated conical part 35 and is going clean through by holes 36 perpendicular to each one of the slots 32.

Advantageously, it has been set up into each one of the slots 32, a locking segment 37 as it appears clearly on FIG. 22.

Figure 23:
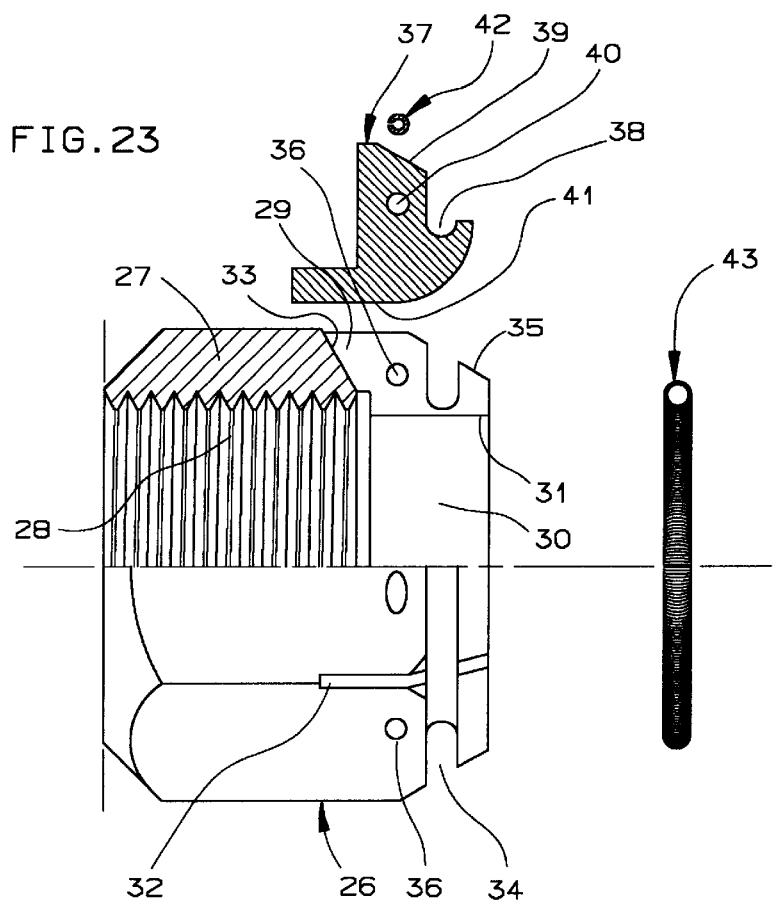
FIG. 23 is an exploded, side elevation view, partly in cross-section, of the nut of FIG. 22, according to the second embodiment of the present invention.

As may be noted from FIG. 23, the locking segments 37, besides all be identical, are provided with an aperture 38 externally oriented, a hole 40 and a ramp 39 of same inclination than the truncated conical part 35 of the nut 26. Moreover, as represented on FIG. 21, and in this case their internal part is a tooth 41 of squared shape.

The locking segments 37 will be, as represented on FIG. 23, introduced in each of the slots 32, in such a way to have the holes 36 and 40 in a perfect alignment allowing to be crossed by pivots 42 as better represented on FIG. 25.

The sizes of the diameters of the holes 36, the holes 40 and the pivots 42 are determined in a such a way the pivots 42 are firmly prisoner in the holes 36 and the segments 37 movable in rotation on these same pivots 42; the resilient pins, such as represented, meet perfectly these requirements and will be so preferably used.

Figure 24:
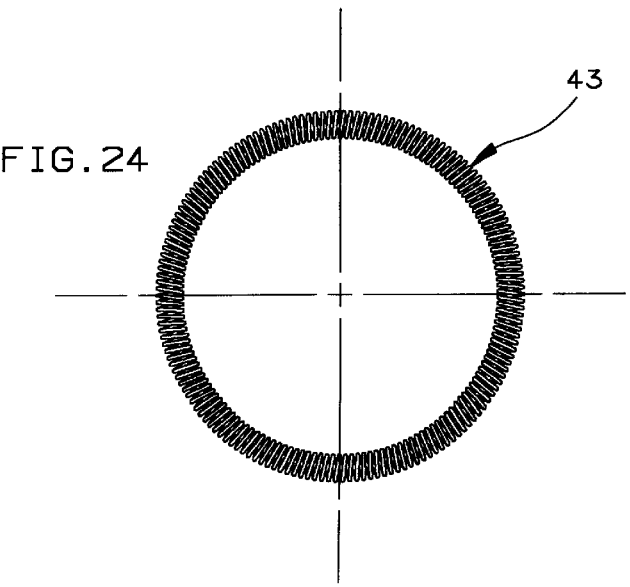
FIG. 24 is a front view of the closed torical spring of FIG. 23.

On the assembly so formed a resilient ring may then be introduced, which in this case as represented on FIG. 24, is a closed torical spring 43. This torical spring 43 is located in the external circular groove 34 and fits exactly, through each radial slot 32 the apertures 38 of each of the locking segments 37.

Consequently, as represented on FIG. 26, the locking segments 37 may then, under an axial pressure exerted on each of their tops, and independently of one another, rock of an angle "alpha", independently of one another, round each of their own pivot 42 providing the opposition of a certain radial stress "F" exerted on each of them by the closed torical spring 43 which, continually, tends to bring them back to their initial position as represented on FIG. 22.

It is advisable to note also, as represented on FIG. 22, that each of the locking segments 37 is slightly sticking out the external shape of the nut of a same value "E" and, that each of their ramp 39 is in a perfect alignment with the ramp of same inclination of the truncated conical part 35 of the nut 26.

Consequently, it results then on FIG. 26, that the simple action to engage a tool 44, of hexagonal or other internal shape, on the nut so constituted leads to an obligatory hooking with the locking segments 37 sticking out, of a value "E", the hexagonal or other external shape of the nut 26 inducing them to rock of an angle "alpha" round each of their own pivot 42 with as a consequence the full disengagement of the tooth 41 from the female shape 25 evident on FIG. 27; it is then spoken of an unlocked system which may move freely in rotation on the shaft. It can be noted on FIG. 28, that in this case, the spring 43 takes a convex polygonal shape.

As opposed, and as represented on FIG. 30, the simple action to release the tool 44 (not represented) from the system, leads thanks to the combined action of the closed torical spring 43 to the rocking in the inverse direction of the locking segments 37 round their own pivot 42, with as a result, the perfect engagement of the tooth 41 in one of the corresponding grooves of the female serrations 25, evident on FIG. 32; it is then spoken of system with positive automatic locking, that may not move anymore freely in rotation on the shaft. It can be noted on FIG. 31, that in this case, the spring 43 comes back to its initial circular shape.

As noted in the first embodiment, it is also necessary to note in this second preferred embodiment of the invention that, when the number of grooves of the serrations 59 of the shaft 23 is an integer multiple of the number of locking segments 37, all the locking segments 37 of the nut 26 are in a locked position and the type of locking is called "simple".

If at the contrary, it is not the case, which means that the number of grooves of the serrations 42 of the shaft 23 is not an integer multiple of the number of locking segments 37, at least one locking segment is in a locked position and the type of locking is called "differential", which will have as a result, to increase considerably the angular precision of locking. It can then be noted on FIG. 33, that in such circumstance, the spring 43 takes a convex polygonal shape but of which one of the tops of the polygon is truncated, the reason is that the teeth represented on FIG. 34 and 35, at the contrary to the tooth represented on FIG. 36, is not in front of a corresponding groove of the female serrations 25; it is then spoken of positive and micrometric automatic system that may not move anymore freely in rotation on the shaft.

A third preferred embodiment of the present invention will allow, on base of the functional principles stated in the description of the two first preferred embodiments of the present invention, to offer the three complementary advantages that follow: The first one which will consist in a pure and simple suppression of the pivots 20 and 42 of the locking segments 15 and 37, in cases of applications for which the mechanical stresses applied on the locking segments 15 and 37 will enable it, the second one which will provide the possibility to manipulate the nut laterally with the help of a closed key when an axial access is impossible and, the third one which will provide the guarantee to always have a nut locked, whatever it may be its angular position on the shaft.

It may be already noted on FIG. 38 on the section of one of the locking segments, that all ones are, through an aperture 46, passed through by a circular resilient ring or a closed torical spring 45. Additionally, the locking segments 44 are also provided on their front part with a concave firm solid angle of intersection of flat areas 48 and 49 from their front faces. This concave firm solid angle 47 is intended to receive a convex firm solid angle 50 constituted by the junction of the flat area 51 and the conical part 52 of the nut; the conical part 52 being materialized by a internal circular chamfer machined at the exit of the thread 53 of the nut 54.

The fitting of the firm solid angles 47 and 50 allows then the locking segments 44 to rotate, independently of one another in each of their radial slots 55, of an angle "beta" round convex firm solid angles 50, constituting then the own rotation axles of the locking segments 44.

It can then be noted on FIG. 40 that, like for the two first preferred embodiments of the present invention, the simple action to engage a closed key 56 on the nut 54 leads inevitably to the hooking of the locking segments 44 with the internal shape 57 of the key involving thereby the rocking of an angle "beta" of every locking segments 44 round each of their own convex firm solid angle 50, this having as a result, as represented on FIG. 39 to disengage each of the teeth 58 of the locking segments 44 from the serrations 59 of the shaft 60 enabling so to tighten or to untighten the nut 54 by a radial manipulation.

In corollary and, as represented on FIG. 38, the simple action to 30 disengage the closed key 56 from the nut 54 releases the segments 44 which, subject to the stress "F" of the resilient ring or closed torical spring 45, rock of an angle "beta", in the inverse direction round each of their own convex firm solid angle 50 engaging at least one of their teeth 58 in one of the grooves 60 of the serrations 59, as represented on FIG. 37, locking so the nut, in a positive and micrometric automatic manner. Moreover, the angle "gamma" between two teeth will be calculated in a such way that, whatever the angular position of the nut on the shaft may be, at least one locking segment is in a locked position in such a way to always ensure a perfect locking of the nut, whatever its position on the shaft may be.

It will be noted that in the three preferred embodiments of the present invention, the axles of rotation (20)(42)(50) are realized either by a pivot or better by resilient pin (20)(42) or by a firm solid angle (50).

Figure 1:
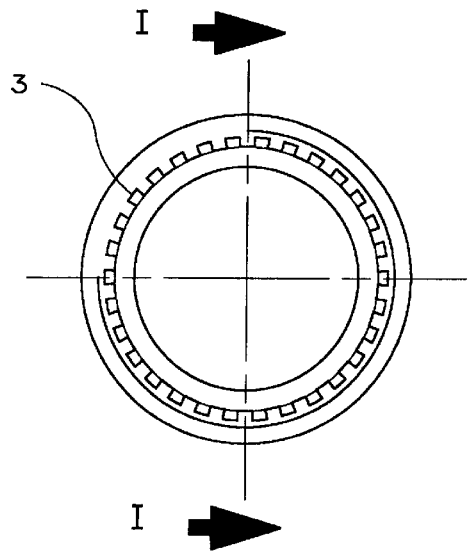
FIG. 1 is an end view of the shaft of FIG. 2 according to a first embodiment of the present invention.

It will be also noted that, as mentioned in the description of the first preferred embodiment of the present invention, the male serrations 3 were located on a protrusion 2 of the shaft 1, as represented by the FIGS. 1 and 2; this possibility is not a unique one and it is no doubt about to conceive, without restricting it: serrations 63 directly machined on the thread 64 of the shaft as represented on FIGS. 42 and 43, serrations 65 located at the end of the shaft and obtained by radial milling 66 as represented on FIGS. 44 and 45, or even serrations 67 at the entry of the shaft and obtained by windows 68 cut in the thickness of the shaft as represented on FIGS. 46 and 47.

Figure 48D:
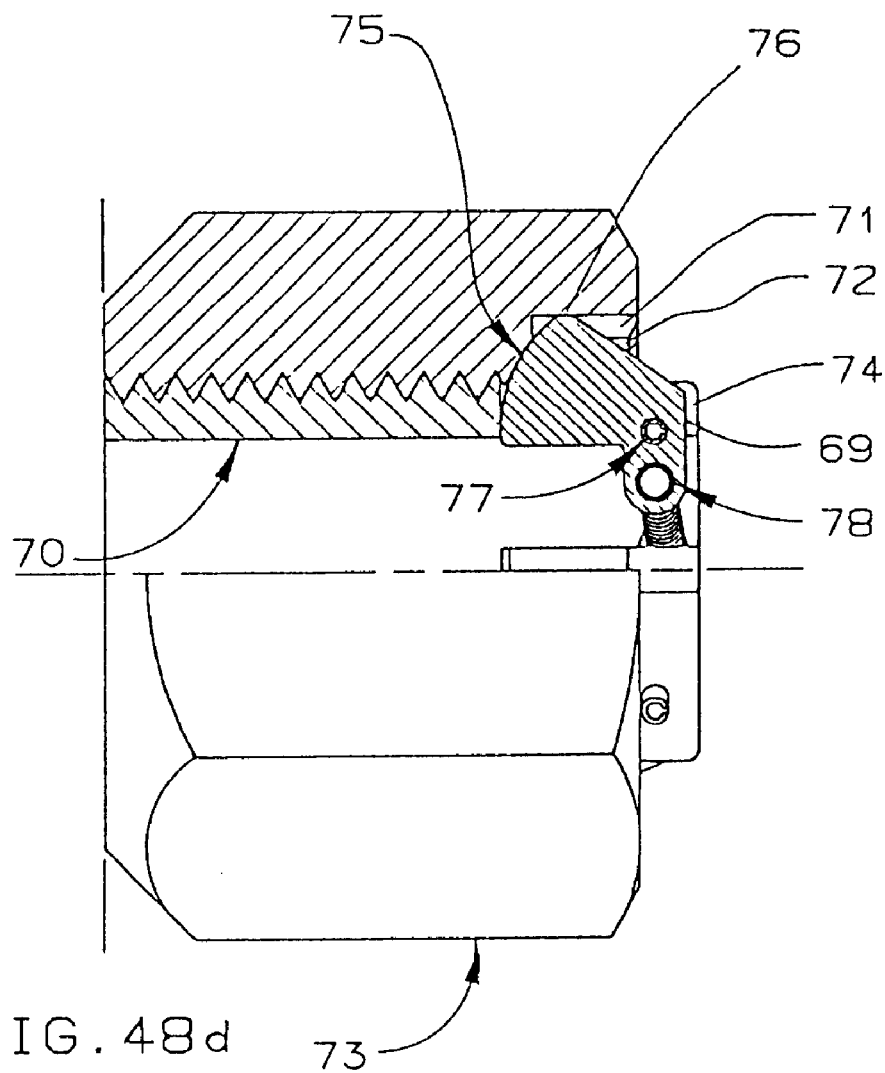

Finally and according to the further embodiment as represented on FIG. 48d, the locking principle of the first embodiment of the present invention can be inverted by adapting to the shaft the same locking means as those initially intended for the nut and vice versa by adapting to the nut the same locking means as those initially intended for the shaft.

The nut 73 has in its rear part a circular internal recess in which are made serrations 72 the aim of which being to receive the teeth 76 of the locking segments 75 each rocking in their own slot 74 axially milled in the rear wall thickness of the hollow shaft 70 round their own pivot 77 perpendicularly installed to the longitudial axis of the hollow shaft 70 in its wall thickness.

Moreover a close torical spring 78 is going clean through each locking segment 75 forcing them permanently to rock in the present case clockwise round their own pivot 77 and so to go in the opposite female serrations 71 of the nut in order to lock it positively, micrometrically and automatically.

What is claimed is:

1. A positive and micrometric locking assembly comprising:
   a threaded shaft,
   a nut threadably engaged on said shaft,
   plural locking segments movable between a locked position and an unlocked position, each said locking segment including an aperture and at least one tooth,
   wherein one of said shaft or nut comprises axial grooves and the other of said shaft or nut has said at least one locking segment pivotally connected thereto, and said locked position comprises the engagement of said at least one tooth with at least one said axial groove, rotationally locking said nut relative to said shaft,
   a resilient ring received in said aperture for urging said locking segments radially toward said locked position,
   whereby each said locking segment is constantly and independently urged toward said locked position by said resilient ring allowing each said locking segment to move independently of other segments and at least one said locking segment achieves said locked position.

2. The positive and micrometric locking assembly of claim 1, wherein said resilient ring comprises a circularly closed helical spring.

3. The positive and micrometric locking assembly of claim 1, wherein said nut includes an external circular groove located in an external surface of said nut, said resilient ring is received in said circular groove, said shaft comprises an end and said axial grooves are formed on an outside surface of said shaft end and each said locking segment is present on said nut.

4. The positive and micrometric locking assembly of claim 1, wherein said nut includes an external circular groove located in an external surface of said nut, said resilient ring is received in said circular groove, said shaft includes an end, said shaft end includes an axial bore and said axial grooves are formed on an inside surface of said axial bore and each said locking segment is present on said nut.

5. The positive and micrometric locking assembly of claim 4, wherein said nut has an external shape and said locking segments comprise tangs which project out of the external shape of said nut.

6. The positive and micrometric locking assembly of claim 5, wherein said assembly comprises an installation tool having an internal shape substantially identical to the external shape of said nut.

7. The positive and micrometric locking assembly of claim 6, wherein placement of said installation tool over said nut causes said installation tool to engage said tangs, moving said locking segments from said locked position to said unlocked position and permitting rotation of said nut relative to said shaft and removal of said installation tool allows said locking segments to return to said locked position.

8. The positive and micrometric locking assembly of claim 1, wherein the number of said grooves is an integer multiple of the number of locking segments and all said locking segments are capable of simultaneously achieving the locked position.

9. The positive and micrometric locking assembly of claim 1, wherein the number of said grooves is not an integer multiple of the number of locking segments and at least one said locking segment is capable of achieving the locked position.

10. The positive and micrometric locking assembly of claim 1, wherein said locking segments are present on said nut and said axial grooves are formed on said shaft and said nut includes a radial slot for each locking segment, said locking segments are movably retained in said radial slots and pivot from said locked to said unlocked position.

11. The positive and micrometric locking assembly of claim 10, wherein each said locking segment pivots on an axle.

12. The positive and micrometric locking assembly of claim 10, wherein each said locking segment includes a convex angled tip and said locking segment pivots on said tip.

13. The positive and micrometric locking assembly of claim 1, wherein said locking segments are configured so that rotation of said shaft generates a centrifugal force urging said locking segments toward said locked position, said force increasing proportionate to the rotational speed of said shaft.

14. The positive and micrometric locking assembly of claim 1, wherein said nut is of hexagonal shape.

15. A positive and micrometric locking assembly comprising:

a threaded shaft including an end having axial grooves, a nut threadably engaged on said shaft, said nut including an external circular groove located in an external surface of said nut, plural locking segments carried by said nut and movable between a locked position and an unlocked position, each said locking segment including a externally oriented aperture and at least one tooth, said locked position comprising the engagement of said at least one tooth with at least one said axial groove, rotationally locking said nut relative to said shaft, and a resilient ring received in said external circular groove and said externally oriented aperture for the purpose of urging said locking segments radially inwardly toward said locked position, whereby each said locking segment is constantly and independently urged toward said locked position by said resilient ring and at least one said locking segment achieves said locked position.

* * * * *